May 16, 1950     F. HOTCHNER     2,507,975
RETROREFLECTIVE ANIMATION DISPLAY
Original Filed March 12, 1945     2 Sheets-Sheet 1
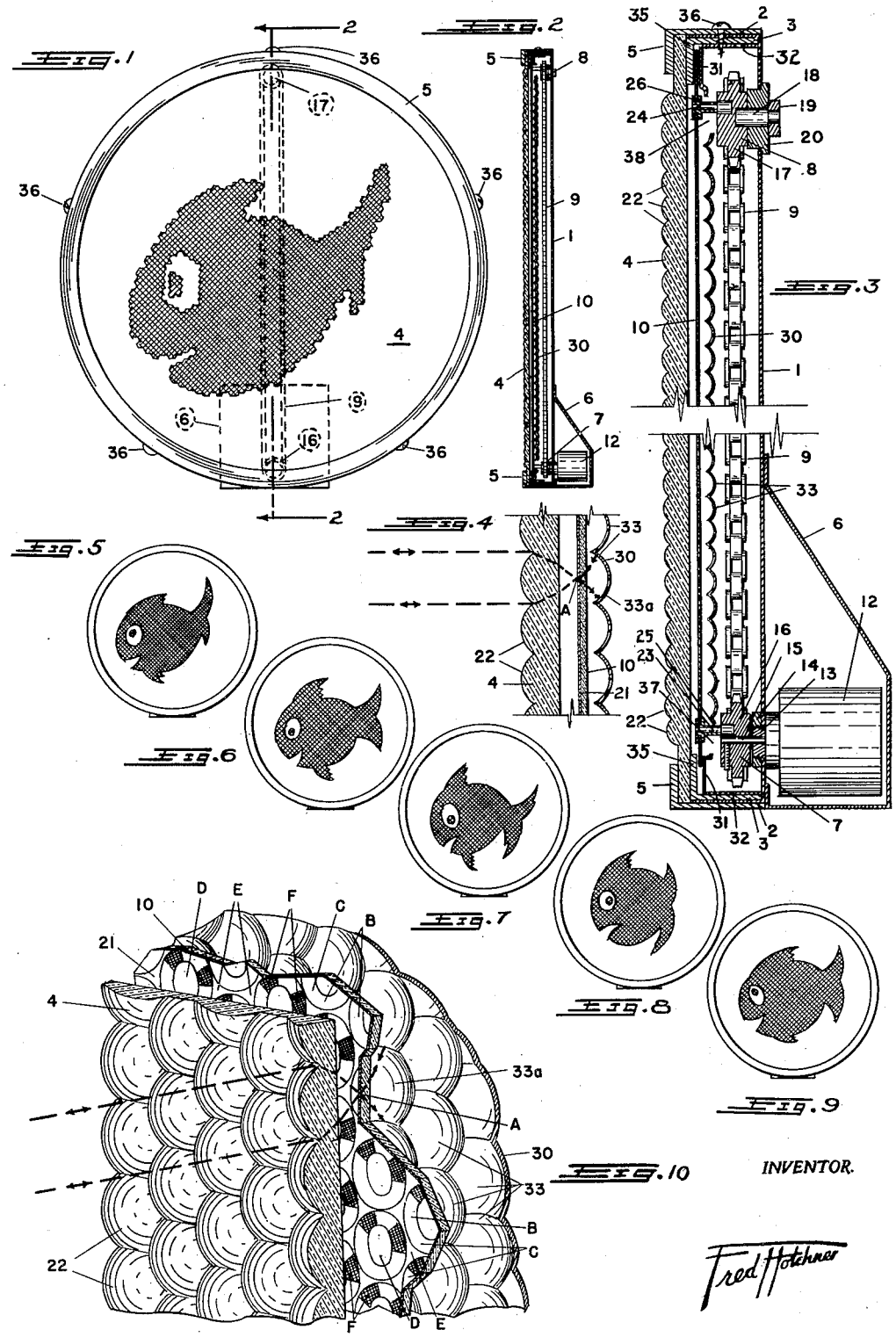
INVENTOR.
Fred Hotchner May 16, 1950      F. HOTCHNER      2,507,975
RETROREFLECTIVE ANIMATION DISPLAY
Original Filed March 12, 1945      2 Sheets-Sheet 2
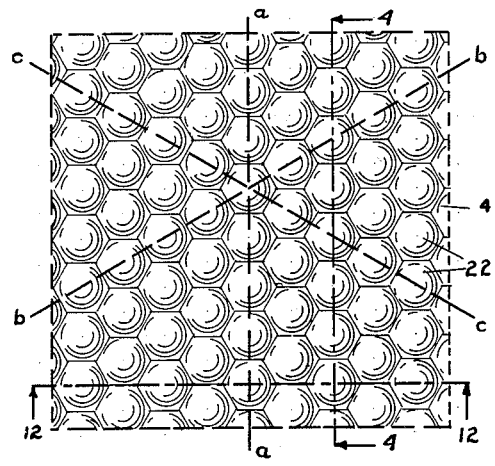
Fig. 11
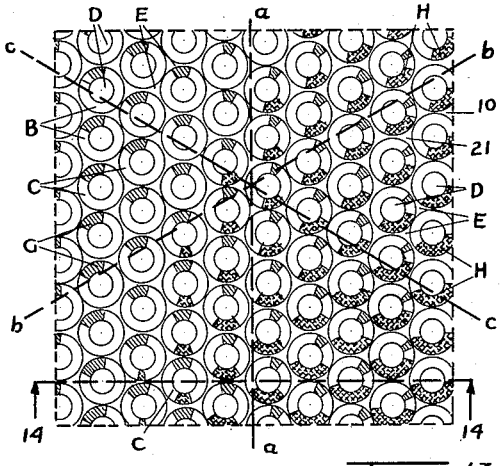
Fig. 13
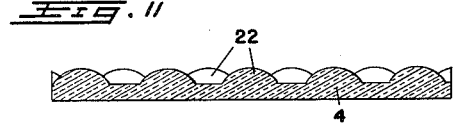
Fig. 12
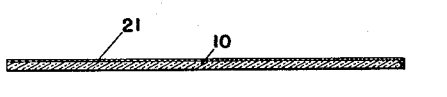
Fig. 14
Fig. 15      Fig. 16
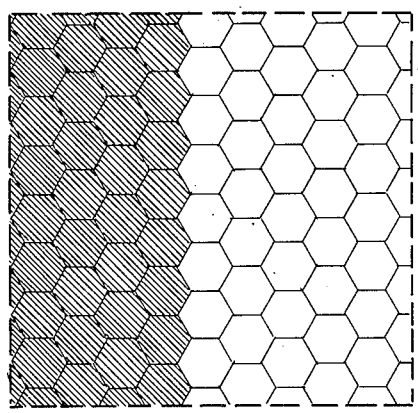
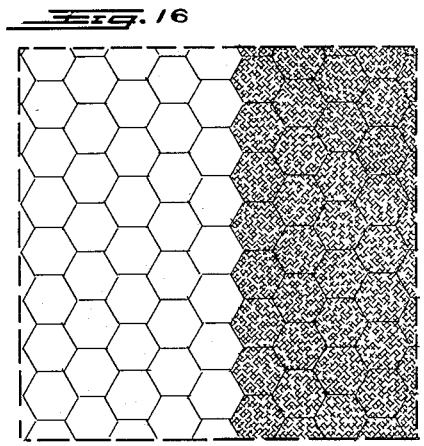
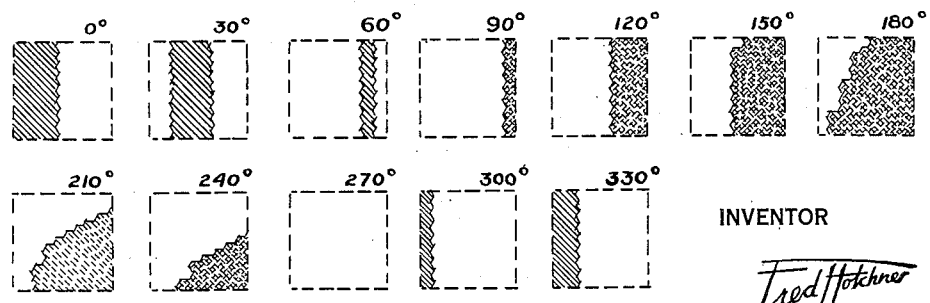
Fig. 17
INVENTOR
Fred Hotchner Patented May 16, 1950

2,507,975

UNITED STATES PATENT OFFICE 2,507,975

RETROREFLECTIVE ANIMATION DISPLAY

Fred Hotchner, Los Angeles, Calif.

Original application March 12, 1945, Serial No. 582,368, now Patent No. 2,432,896, dated December 16, 1947. Divided and this application March 15, 1947, Serial No. 735,015

4 Claims. (Cl. 40—130)

This invention relates to an animated retroreflective display device and provides apparatus which receives light rays coming from the general direction of the observer, modulates the rays and then returns them by reflection in the general direction of the observer, the modulation being so effected as to produce the illusion of animation over the display surface.

This application is a division of my copending application of the same title, filed March 12, 1945, Serial No. 582,368, now Patent No. 2,432,896, issued Dec. 16, 1947.

Numerous retro-reflective sign types are known in the prior art, finding their highest utility as highway or roadside signs which are rendered luminous to the view of riders of approaching cars by reflection of rays of the headlight beams. It is an object of this invention to provide devices of this general type with the new feature of changeable copy and animation in realistic simulation of natural or fanciful objects in motion.

It is an object to produce a device of this character which will be capable of representing motion in any direction across the display surface, and at any speed from place to place over the display surface, and changing in direction and speed from instant to instant during the action as desired, and in any color or combination of colors, or changing in color, and in a variety of techniques of rendition.

It is an object to produce a device which will be simple and rugged in construction, reliable, and capable of operation over long periods of time with the minimum of attention. To this end I have contrived to produce all the various types of action effects described by the use of a single major moving element which will be light in weight and which will have an actual mechanical displacement of very small distance, generally a fraction of an inch for fairly large displays.

Another object is to produce a device in which the display subject or copy may be readily changed by the substitution of a new element for the old with very little work and expense.

A further object is to produce an animation device which will be capable of producing a continual motion effect by the repeated showing of a limited number of scenes, which effect will be realistic and free from monotonous repetition.

Various other objects of the invention will be apparent from the following specification taken in consideration of the accompanying drawings.

The invention is shown in a certain preferred embodiment in the accompanying drawings, in which the same reference numeral appearing in several views is used to indicate the same or the equivalent part throughout.

In the drawings:

Figure 1 is a front elevation of a portable, stand type, retro-reflective display device made hereaccording. On the display surface is shown one scene of a sequence of scenes in black and white silhouette of an animation effect. The outlines of the object depicted are shown as following the boundaries of the individual lenses of the lens screen, producing a serrated effect when a single scene is viewed.

Figure 2 is a sectional elevation of the device taken along the section line 2—2 in Figure 1 showing the box construction, the mounting of the screens, and the driving mechanism.

Figure 3 is a cross section on an enlarged scale of the device, fragmented by the removal of the mid section, taken along the same section line, illustrating the screens in their relationship to each other and the details of the mechanism.

Figure 4 is a vertical cross section through the screens shown in their proper relative positioning and showing a single beam of parallel rays incident perpendicularly on one of the lenses of the lens screen and passing into the device to be modulated by the pattern screen and reflected back through the same lens to the field of view. The arrow heads pointing in the two directions are indicative of the fact that the same broken lines define the incident and the reflected beam. This section is taken along a plane passing through the centers of a vertical row of lenses as indicated by the section line 4—4 in Figure 11. The scale is substantially enlarged over the full size of the elements of portable displays of commercial sizes.

Figure 5 is a front elevation of the device on a scale reduced from that of Figure 1 showing the same scene on the display surface. As the scale is too small to show the serrated outlines of the object depicted, they are shown smooth. The view, together with Figures 6, 7, 8 and 9 show successive scenes of an animation effect which is typical of one kind of animation which may be had with this invention. It is noted that the action is continuous from Figure 9 through Figure 5 so that the motion is smooth and not broken by pauses or jumps in the motion of the object shown.

Figure 10 is a fragmentary perspective view of the assemblage of the screens of the device, showing in broken lines the boundaries of a beam of rays collected by one of the lenses and as it is projected into the device and reflected back through the lens to the field of view.

Figure 11 is a front elevation, on a scale somewhat enlarged over full size scale for the usual portable type of device, of a portion of the lens screen to show the nesting of the lenses along three sets of center lines indicated by the reference lines a—a, b—b and c—c.

Figure 12 is a cross section of the same taken along the section line 12—12 in Figure 11.

Figure 13 is a front elevation of a portion of a pattern screen corresponding in scale to Figure 11 and showing an arrangement of patterns to produce a certain animation effect in color over this portion of the display surface. The effect which will be produced by the scanning of this portion of the pattern screen by the corresponding lenses of the lens screen will be a part of the larger effect over the whole display surface. The purpose of this illustration and that of the following views is to show how motion in any direction and at any speed may be represented over the display surface by the proper design of the patterns and also to show the use of changing colors in the effect. The patterns are spaced in the same order as the lenses shown in Figure 11.

Figure 14 is a cross section of the same taken along the section line 14—14 of Fig. 13 to show the construction of the screen and the location of the surface on which the patterns are inscribed or formed.

Figures 15 and 16 are two views of the portion of the animation effect which will be observed on the portion of the lens screen shown in Figure 11 at two different stages in the operation of shifting one screen relative to the other with each lens scanning one of the patterns and moving around the circuit thereof simultaneously with all of the other lenses.

Figure 17 is a series of views on a reduced scale of the effect seen over the portion of the lens screen shown in Figure 11 when it is shifted relative to the portion of the pattern screen shown in Figure 13 in such fashion that each of the lenses scans its corresponding pattern in a clockwise direction around the pattern circuit. The views are taken at 30 degree intervals, Figure 15 being an enlargement of that view which is indicated in Figure 18 as taken at 0°, and Figure 16 being an enlargement of that view which is indicated as taken at 120°.

The essential elements of the invention in the embodiment shown are: The lens screen for condensing light coming from the field of view into convergent beams focusing at a given focal plane, a reflector screen fixed with relation to the lens screen and so conformed as to reflect the beams after they have passed through the focal plane back through the focal plane and the lenses to the field of view, a light permeable pattern screen bearing a circuitous, variable permeability, light modulating pattern for each of the lenses, mechanism to position and to shift said pattern screen in the focal plane relative to the lens and reflector screens in such fashion as to cause each beam to traverse the circuit of one of the patterns, and a container to position and protect the elements above described. In the preferred form of the invention the lens screen and reflector screen are stationary, with the lens screen forming the front cover of the container.

The device of Figure 1 has the proportion and general construction of the typical portable stand sign for locations in and around stores and in store windows. Being of the retro-reflective type it is most effective when positioned so as to throw back to the observer light which reaches it from the observer's general direction. Such a location as a back wall and under illumination by a spot light is suitable for this device. The general construction here shown, with such mechanical modifications as required by the special conditions of the case, may also be taken as typical of the device as constructed for roadside and other outdoor locations in which the headlight of a car in which the observer may be riding serves as the source of illumination.

The container is a shallow box having the back 1 and the rim 2. A spacer ring 3, positioned within the rim and in contact with the back, has an inturned flange 35. The rear surface of this flange serves as a guide for the movable pattern screen 10, and the front surface as a seat for the stationary lens screen 4. The clampdown ring 5 holds the lens screen in place. The assemblage of box and lens screen, comprising the enclosure proper, is secured by the sheet metal screws 36 located at suitable intervals around the rim.

The reflector screen 30 is positioned to the rear of the lens screen, parallel thereto, and spaced therefrom at a distance such as to meet the conditions described below in the explanation of the optical system of the device as illustrated in Figure 4. This reflector is provided with a flat edge portion 31 and a backturned flange 32. This flange is of such length as to seat against the back of the box with the front surface of the edge 31 positioned just far enough back of the flange 35 of the spacer ring 3 to form therewith a guide for the rim of the pattern screen 10. The reflector is also held by the screws 36 which are driven through the rings 3 and 5, the rim 2 of the box and the flange 32 of the reflector screen as the final assembly operation.

The driving mechanism consists of the lower drive unit 7 and the upper drive unit 8 connected together by the chain 9. The motor 12, at the bottom of the box, is held to the back of the box by means of the threaded hub 13 and lock nut 14 with the shaft 15 within the box, and the motor proper to the back. The cover 6 forms the motor compartment with the back of the box and also forms the back stand for the device.

The lower sprocket 16 is carried and driven by the motor shaft. The upper sprocket 17, with its stud shaft 18 and collar 19, idles in the journal plate 20 secured to the back of the box. These sprockets each carry one of the eccentrically located stud pins 23 and 24. The eccentricity of both pins is the same and equal to the mean radius of the patterns on the pattern screen. The sprockets are connected together by the chain so that both pins are held and driven in the same angular position.

The pattern screen is positioned between the lens screen and the reflector screen slidable in the rim space between the flange 35 and the reflector rim 31. To it are secured the journals 25 and 26 which extend backward through the openings 37 and 38 in the reflector screen and ride on the pins 23 and 24. Thus, in operation, every point of the pattern screen is shifted along a circuitous course the same as every other point. The diameter of this circuitous course is the mean diameter of the patterns. The pattern screen is located along the focal plane of the lenses. Hence, with parallel rays incident perpendicularly on the lens screen, a bank of bright spots will be projected on the pattern screen. As the screen is shifted by the motion of the pins, each spot will traverse along a circuitous course.

It will be appreciated from the construction described, that changes of effects may be made very quickly by opening the box and slipping the pattern screen off of the stud pins and inserting in its place a new screen with different inscriptions. To insure accurate registry of the lenses with the patterns the lens screen may be cemented to the ring 5 or by any suitable mechanical attachment prevented from turning when the copy changes are made.

Referring now to Figure 4 we find the lens screen composed of a bank of plano-convex lenses 22. Generally this is desirable from the standpoint of cost as such a lens plate may be readily pressed or cast from glass or any of several available resins. However the double-convex form may be used. The smooth side of the plate may be turned out with the form shown, and any other desirable modification adopted in adaptation to commercial conditions.

A beam of light incident on one of the lenses is indicated by broken lines. This beam is similarly indicated as converging to a focal point A on the front surface of the pattern screen. On this surface is a thin layer of material 21 suitable for carrying the pattern impressions. The pattern screen, with this layer 21, serves as the light modulating element of the device. They are described in their construction and function below.

The reflector screen 30, positioned to the rear of the pattern screen, is formed with a bank of spherical indentations 33. Each of these indentations is in alignment with one of the lenses and so centered with the focal point of its corresponding lens that it serves as a spherical reflector to send back to the lens and to the field of view the light which falls upon it coming through the focal point. The broken lines in Figure 4 define the boundaries of a single beam collected by one of the lenses from an object directly in front of the device, projected in convergence to the focal point on the pattern screen, passing through a transparent area of one of the patterns, collected by the reflector indentation 33a and reflected thereby back through the patterns screen and the lens to the field of view. The arrow heads pointing in two directions indicate that the incident and emergent beams are involved.

In order to more clearly illustrate the optical system formed by the screens, they are shown in fragmentary perspective in Figure 10. The lens screen is sectioned along a vertical plane perpendicular to the screen and passing through the centers of several of the lenses. The vertical section of a beam collected by one of the lenses from an object directly in front of the device is shown by broken lines along this plan. The beam is shown thereby as condensed to the focal point A on one of the patterns of the pattern screen at a transparent area thereof, transmitted to and reflected back through the pattern by the reflector indentation 33a, and finally projected back to the field of view by the the same lens through which it enters, the two-directional arrow heads being indicative of the ray tracing.

While, for the sake of descriptive clarity, I have assumed that each beam will be focused at a "focal point," actually the bright spot will not be a "point" but a small bright region. The incident light will not be of parallel rays but include rays of all divergencies. In commercial constructions the idealized optical system described can be achieved only in approximation. The rays which are collected and reflected in such manner as to give rise to the observed animation effect will be found to constitute beams of certain minimum convergence in their incidence on the lenses, and in their reflection, beams of certain minimum divergence from the lenses to the field of view. Since it is advantageous to produce retro-reflective devices which display the animation effects over fairly broad angles of view, the practical result is that they may be constructed by ordinary non-precision fabrication methods.

The size of the bright spots produced on the pattern screen will determine the number of scene changes which can be had with a given construction. The broader they are, the fewer the number of individual scenes which can be represented by the inscriptions around the courses of the patterns.

Referring now to the portion of the patterns screen to be seen in Figure 10: A plurality of circuitous patterns are seen formed, or inscribed, on the front surface of the screen 10. These patterns are distributed over the screen in the same order as the lenses of screen 4, and so arranged that, for parallel light falling perpendicularly on the lens screen, a spot of light will be projected onto each of the patterns by its corresponding lens, and in the same circuit position for all of the lenses.

The eccentricity of the pins 23 and 24 is the same and equal to the mean diameter of the patterns. They are located at the same angular position on their sprockets. Thus, as the sprockets are driven together by the chain, the pattern screen is shifted bodily with every point on it being carried along a circuitous course of the mean pattern diameter. The patterns are therefore located on the screen so that each lies along the course of the focal point traced by its corresponding lens as one screen is thus shifted relative to the other. In Figure 10 the patterns are shown occupying the areas between the concentric circles as indicated by B.

The areas marked D within the patterns and the areas marked E each of which falls between three adjacent patterns, are not involved in the effect and hence may be finished in any suitable fashion, or even left unfinished if desired.

The animation effects are produced by the various modulation of the light beams as they fall upon the patterns and are obscured by opaque areas, filtered by colored areas, reduced in intensity by partially transparent areas, or passed by transparent areas, and returned to the field of view by the optical elements. By constructing the pattern screen with variable permeability patterns of suitable design any desired type of display effect may be produced within the limits of the device. The patterns which are to be seen in Figure 10 are opaque along parts of their courses, as illustrated by the cross hatching of such areas as those indicated by F. Light falling on such areas will be blocked and the portions of the lens screen corresponding to the lenses which project the beams onto such areas will appear dark to view.

Other areas are fully transparent and transmit the beams. Such areas are illustrated as clear in the view and certain of them indicated by C. The parts of the lens screen corresponding to the lenses which project beams through these areas to be reflected back and to the field of view will appear light to the view by virtue of such retro-reflected beams. The type of image illustrated by Figures 5 to 9 would be produced by patterns of this opaque and transparent design.

The pattern screen may be constructed in various fashions. One practical construction is to utilize a sheet of clear transparent resin of the type known commercially as "Vinylite." This material is light and of sufficient durability and dimensional stability to serve under the working conditions met in this device. It may be processed for the pattern impressions in several ways. The pattern impressions may be applied as a decalcomania transfer. They may also be applied by silk screening with suitable paints or varnishes. Or they may be printed or developed by photographic methods in an emulsion layer. Various other methods are available in the graphic arts for producing the pattern screens. For any of these types of pattern representation the layer is indicated in the drawings by numeral 21.

Considering now Figures 11 and 12 it is seen that the lens distribution along banks of center lines, represented by the lines $a$—$a$, $b$—$b$ and $c$—$c$, 120° from each other, provides complete coverage of the display surface by the lenses so that all of the light falling on the surface is used in the effect. Noting the serrated condition of the outlines reproduced in Figure 1 and Figures 15, 16 and 17, it is to be understood that each lens enters into the effect substantially as a unit with no detail over its area. That is to say, since it is at focal distance from the pattern, as it passes from a region of one color on the pattern to a region of a different color the change which takes place to view occurs over the entire surface of the lens practically instantaneously. This accounts for the serrated effect of the outlines of the object depicted in Figure 1 and seen in Figures 15, 16 and 17. However, in practice, as the effect which is finally produced is that of motion simulated by the rapid showing of one scene after another, each scene being slightly different from the one shown before and after, the effect is smoothed out to the view and in fact the impression of smooth detailing is heightened by the illusion of motion produced.

I have shown in Figure 13 an arrangement of patterns such as will make clear the manner in which motion in different directions at different speeds and in changing colors may be represented. The pattern arrangement is simplified for purposes of illustration, it being understood that many more changes may be produced in practice around the courses of the patterns.

As the pattern screen section shown is operated in the device in association with the lens screen in such fashion as to traverse all of the lenses simultaneously around the courses of the respective patterns in the same angular position relative to each other, the effect of motion in various directions is produced. The views in Figure 17 give the effect at certain intervals, to show the general action. Several times as many views may be taken to show the detailed changes as the action progresses, if desired. The views shown are sufficient to illustrate the variety of effects attainable with the device.

The patterns shown in Figure 13 comprise the annular areas enclosed by the pairs of concentric circles, indicated by B. The areas D and E are not reached by the beams thrown onto the screen by the lenses which originate at any point in the normal field of view, and are not scanned by the lenses to the view of persons in the normal field of view. These areas may therefore be treated in any desired fashion, being left uncoated, or obscured by a dark coating, as desired.

Along the courses of the patterns the areas marked C are left clear to indicate that they are fully transparent and hence appear white as seen by the light returned to the observer's position after passing through the pattern screen and being reflected back through the lenses. The areas marked G are shaded in the convention for green, indicative of the fact that they are finished to filter the transmitted light to a green. The areas marked H as similarly shaded to indicate orange filtering.

The centers of the patterns are arranged in a bank of the same order as the lenses shown in Figure 11. Hence if the lenses of that portion of the lens screen which is shown in Figure 11 be positioned in front of that portion of the pattern screen which is shown in Figure 13 at the proper focal distance and be centered over the patterns at any given section of the pattern circuit, they may be each brought to registry over a similar point of one of the patterns. To indicate this relationship, the reference lines $a$—$a$, $b$—$b$ and $c$—$c$ in Figure 13 are drawn so as to cut the patterns and intersect all crossing lines of the bank of lines thus indicated at the 300° points of the patterns. By moving one of the screens in its plane along a circuitous course of the mean diameter of the patterns each lens may be caused to scan its pattern. Hence at each point of that course there will appear to view on the lens screen an enlarged image which will be a compound image made up of enlargements of a small portion of each of the patterns, as seen by the light coming back through the pattern from its respective reflector indentation, all of which portions will at any stage in the operation be in the same general circuit position on the patterns.

If we thus operate the screens in association with each other so as to produce that image which is represented by the uppermost points of the patterns we have an image as shown in Figure 15. The outlines of the image will be serrated in following the boundaries of the lenses as each lens enlarges a portion of the pattern circuit with substantially no detailing over its individual area. If now one screen is shifted relative to the other so as to cause the lenses to scan the patterns in the clockwise direction we will have an animation effect produced on the lens screen as the different portions of the patterns come into and go out of registry with the lenses. This effect is shown in approximation in the series of small views in Figure 18.

At 0° we have the showing of Figure 15 which is that of a green area extending from the left to a vertical boundary near the center of the image and a white area over the rest of the image. This green area is moving to the right, becoming a vertical strip of green which becomes narrower in the next two views marked 30° and 60° and vanishes near the right hand edge of the image. There are thus two different speeds in this part of the action. At 90° an orange shadow is seen moving from the right hand edge with a vertical boundary toward the left. The lower portion of this shadow moves faster so that when we reach 180° it has a boundary in an oblique position. It then recedes toward the lower right at a much higher speed.

At 120° the image is entirely white. At 300° the green shadow is found starting from the left hand edge of the image and moving toward the right. From this we demonstrate that motion in any direction and at any speed in any color or color combination may be represented, limited only by the amount of space available along the patterns and the size of the area being scanned on each pattern at any instant. These factors have to do with the accuracy of construction, the width of the field of view to which the showing is to be made and other practical considerations. Under practical commercial conditions a sufficient number of changes may be had to produce very effective animation displays.

While I have described my invention in detail above with respect to a certain preferred embodiment thereof, I do not wish to be limited to the specific construction shown or the particular arrangement of parts insofar as permissible modifications under the broad ideas disclosed are concerned, since many changes and modifications thereof are possible and the invention may be embodied in widely varying forms without departing from the spirit and scope thereof in its broader aspects. Hence I desire to include all modifications and arrangements coming within the language and scope of any one or more of the appended claims.

Having thus described my invention, what I claim is:

1. An exhibition device including: a light permeable pattern screen bearing a plurality of circuitous patterns each following the course of a closed circuit of outline common to all and distributed over the image bearing area of said screen, a lens screen positioned in front of said pattern screen and bearing a plurality of lenses conformed to condense light beams coming from the general direction of the normal field of view in front of said device into a plurality of separate beams convergent each to one of said patterns in a small section thereof and in the same general circuit position for all of the same, a reflector positioned to the rear of said pattern screen fixed relative to said lens screen and conformed and positioned to reflect light beams reaching it through the pattern screen back through the pattern screen to said lens screen in such manner that said beams are projected to the field of view as beams of relatively narrow divergence, and means to shift said pattern screen in its plane relative to said lens screen and said reflector along a course determined to cause each of said lenses to continuously scan its respective pattern, the permeability to light of said patterns varying from section to section around the circuits thereof and with respect to each other in proper manner to produce in each stage of the operation above described a distinct image to view by virtue of the modulation of said beams by the pattern sections through which they pass to the proper light values for the portions of the image represented thereby, each image so produced being serially related to all the other images so produced in a sequence of image changes of an animation effect continually repeated by the cyclic traversing of said patterns by said beams.

2. An exhibition device including: a light permeable pattern screen bearing a plurality of circuitous patterns each following the course of a closed circuit of outline common to all and distributed over the image bearing area of said screen, a lens screen positioned in front of said pattern screen and bearing a plurality of lenses conformed to condense light beams coming from the general direction of the normal field of view in front of said device into a plurality of separate beams convergent each to one of said patterns in a small section thereof and in the same general circuit position for all of the same, a reflector positioned to the rear of said pattern screen fixed relative to said lens screen and conformed and positioned to reflect light beams reaching it through the pattern screen back through the pattern screen to said lens screen in such manner that said beams are projected to the field of view as beams of relatively narrow divergence, and means to shift said pattern screen in its plane relative to said lens screen and said reflector along a course determined to cause each of said lenses to continuously scan its respective pattern, the permeability to light of said patterns varying from section to section around the circuits thereof and with respect to each other in proper manner to produce in each stage of the operation above described a distinct image to view by virtue of the modulation of said beams by the pattern sections through which they pass to the proper light values for the portions of the image represented thereby.

3. An exhibition device including: a light permeable pattern screen bearing a plurality of circuitous patterns each following the course of a closed circuit of outline common to all and distributed over the image bearing area of said screen, a lens screen positioned in front of said pattern screen and bearing a plurality of lenses conformed to condense light beams coming from the general direction of the normal field of view in front of said device into a plurality of separate beams convergent each to one of said patterns in a small section thereof and in the same general circuit position for all of the same, a reflector positioned to the rear of said pattern screen conformed to present thereto a plurality of spherical reflecting surfaces each in axial alignment with one of the lenses and so spaced therefrom as to reflect light beams reaching it through the pattern screen back through the pattern screen to said lens screen in such manner that said beams are projected to the field of view as beams of relatively narrow divergence, and means to shift said pattern screen in its plane relative to said lens screen and said reflector along a course determined to cause each of said lenses to continuously scan its respective pattern, the permeability to light of said patterns varying from section to section around the circuits thereof and with respect to each other in proper manner to produce in each stage of the operation above described a distinct image to view by virtue of the modulation of said beams by the pattern sections through which they pass to the proper light values for the portions of the image represented thereby, each image so produced being serially related to all the other images so produced in a sequence of image changes of an animation effect continually repeated by the cyclic traversing of said patterns by said beams.

4. An exhibition device including: a light permeable pattern screen bearing a plurality of circuitous patterns each following the course of a closed circuit of outline common to all and distributed over the image bearing area of said screen, a lens screen positioned in front of said pattern screen and bearing a plurality of lenses conformed to condense light beams coming from the general direction of the normal field of view in front of said device into a plurality of separate beams convergent each to one of said patterns in a small section thereof and in the same general circuit position for all of the same, a reflector positioned to the rear of said pattern screen conformed to present thereto a plurality of spherical reflecting surfaces each in axial alignment with one of the lenses and so spaced therefrom as to reflect light beams reaching it through the pattern screen back through the pattern screen to said lens screen in such manner that said beams are projected to the field of view as beams of relatively narrow divergence, and means to shift said pattern screen in its plane relative to said lens screen and said reflector along a course determined to cause each of said lenses to continuously scan its respective pattern, the permeability to light of said patterns varying from section to section around the circuits thereof and with respect to each other in proper manner to produce in each stage of the operation above described a distinct image to view by virtue of the modulation of said beams by the pattern sections through which they pass to the proper light values for the portions of the image represented thereby.

FRED HOTCHNER.

REFERENCES CITED

The following references are of record in the file of this patent:

UNITED STATES PATENTS

| Number | Name | Date |
|---|---|---|
| 1,679,167 | Nolan | July 31, 1928 |
| 1,792,731 | Craig | Feb. 17, 1931 |
| 1,816,459 | Adelmann | July 28, 1931 |
| 1,851,216 | Shipman | Mar. 29, 1932 |
| 1,987,357 | Bergen et al. | Jan. 8, 1935 |
| 2,432,896 | Hotchner | Dec. 16, 1947 |